Patented Oct. 29, 1935

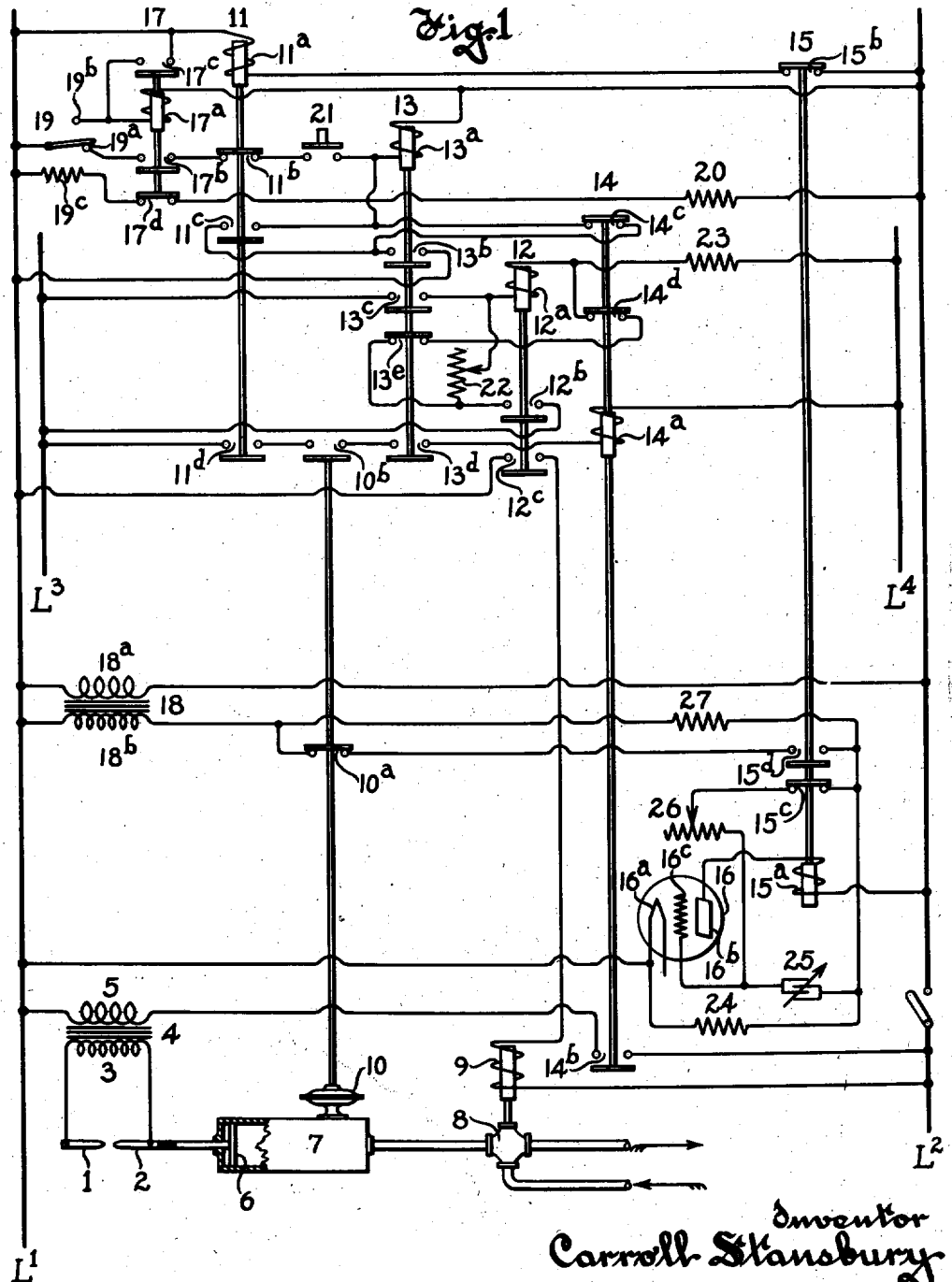

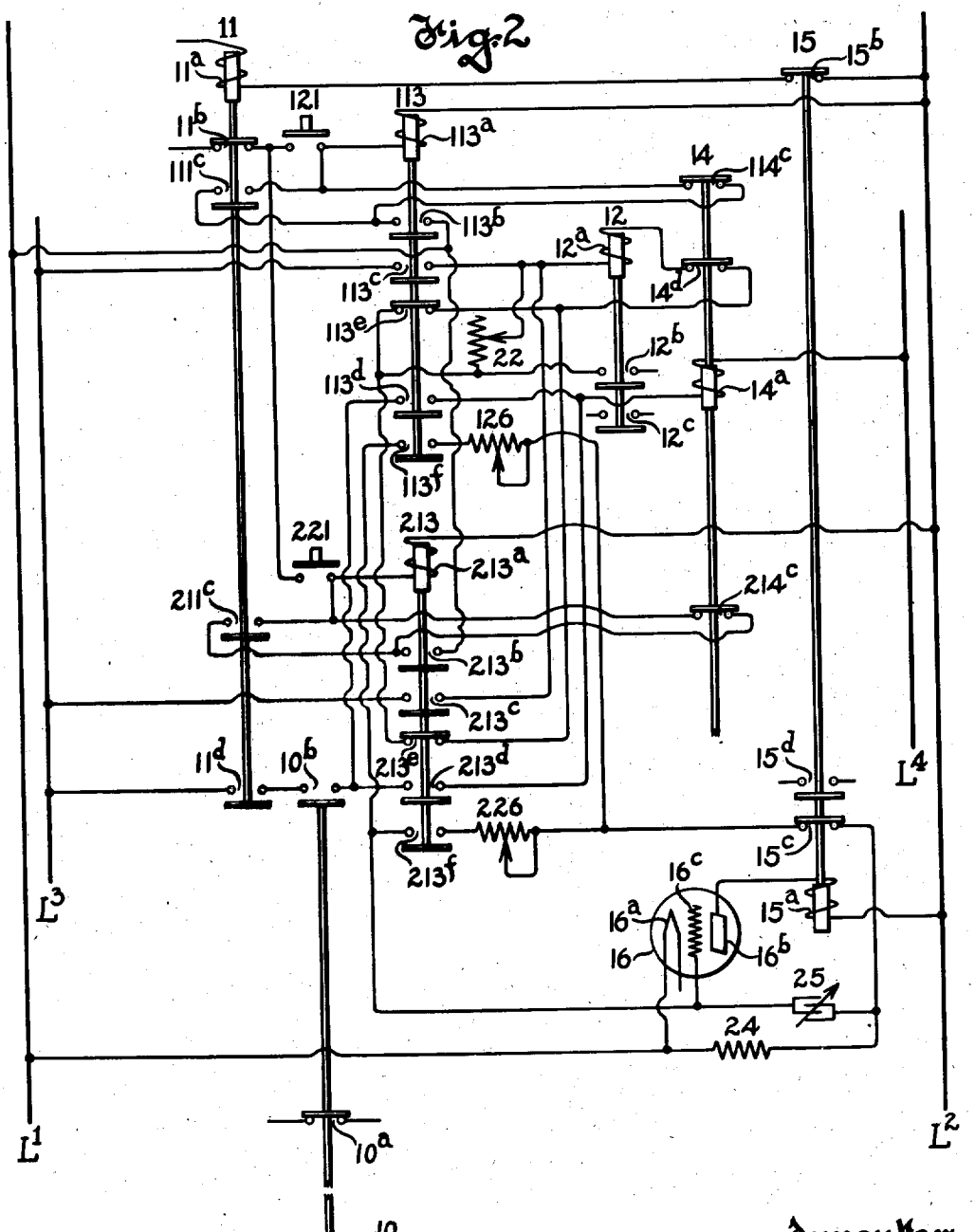

2,019,027

UNITED STATES PATENT OFFICE 2,019,027

WELDER CONTROL

Carroll Stansbury, Wauwatosa, Wis., assignor to Cutler-Hammer, Inc., Milwaukee, Wis., a corporation of Delaware Application October 13, 1933, Serial No. 693,405

7 Claims. (Cl. 219—4)

This invention relates to an electric welding system and is particularly applicable to heavy hydraulically operated electric welders wherein the welding jaws are preferably operated by fluid pressure and wherein it is important to insure that a sufficient amount of energy is delivered to the weld to produce a sound joint. With such heavy welders it is also necessary or desirable to permit sufficient cooling of the weld prior to the release of the pressure exerted thereon. It is also often desired to permit at will the selection of various time intervals during which the welding current is applied, such interval depending upon the quality and size of the material to be welded.

An object of the invention is to provide for a welding system wherein the pressure between the welding jaws attains a certain value before current is admitted to the jaws.

Another object of the invention is to provide a system wherein the time during which the welding current flows is accurately measured, so as to insure the proper temperature of the material to be welded.

Another object is to provide a system wherein pressure between the welding jaws is maintained for a certain time after the welding current is interrupted to permit the cooling of the welded material and thus assure a sound weld.

Another object is to provide a system which assures that the welding current is not admitted to the welding jaws until the latter exert a sufficient pressure upon the material to be welded.

Another object is to provide a system in which the welding cycle is initiated by the operation of a push button starting switch.

Another object is to provide a welding system equipped with a number of starting push button switches by the selection of which it is possible for the operator to select different time intervals during which current is applied to the weld.

Other objects and advantages will hereinafter appear.

The accompanying drawings illustrate an embodiment of my invention.

Figure 1 shows a welding system wherein the welding jaws are operated by fluid pressure and wherein the welding time is controlled by means of an electron tube and electromagnetic switches and relays as will be described hereinafter.

Fig. 2 is a modification of the system shown in Fig. 1 which includes a number of starting push button switches by the use of which the time during which the welding current is supplied may be selected at will.

Referring to Fig. 1, an electric welder is equipped with a stationary jaw 1 and a movable jaw 2 which form the terminals of a welding circuit supplied from the secondary winding 3 of a transformer 4, the primary winding 5 of which is adapted to be connected across the lines $L^1$ and $L^2$ of an alternating current supply circuit. The movable jaw 2 may be moved by a piston 6 of an hydraulic cylinder 7. The cylinder is supplied with fluid under pressure through an electrically operated valve 8, said valve being controlled by an electromagnetic relay 9. The cylinder is further equipped with a pressure responsive switch 10 having a normally closed contact $10^a$ and a normally open contact $10^b$.

The control of the current supply to the welding jaws 1 and 2 and of fluid pressure to the cylinder 7 is accomplished by means of a number of electromagnetic devices as follows: An electromagnetic relay 11 having a winding $11^a$, normally closed contacts $11^b$ and normally open contacts $11^c$ and $11^d$ is adapted to be connected across lines $L^1$ and $L^2$. A relay 12 having a winding $12^a$ and normally open contacts $12^b$ and $12^c$ is adapted to be connected across a direct current supply circuit having terminals $L^3$ and $L^4$. A relay 13 having a winding $13^a$, normally open contacts $13^b$, $13^c$ and $13^d$ and normally closed contacts $13^e$ is adapted to be connected across the lines $L^1$ and $L^2$. An electromagnetic switch 14 has a winding $14^a$ which is adapted to be connected across the lines $L^3$ and $L^4$, normally open main contacts $14^b$ and normally closed auxiliary contacts $14^c$ and $14^d$. A relay 15 having a winding $15^a$, normally closed contacts $15^b$ and $15^c$ and normally open contacts $15^d$ is adapted to be connected across the lines $L^1$ and $L^2$ in series with a gaseous electronic tube 16, having a cathode $16^a$, an anode $16^b$ and a control electrode $16^c$. The cathode may be of the heated type and the heating energy may be supplied in any well known manner. A relay 17 having a winding $17^a$, normally open contacts $17^b$ and $17^c$ and normally closed contacts $17^d$ is adapted to be connected across the lines $L^1$ and $L^2$.

In addition, the controller includes the following elements: A transformer 18 has a primary winding $18^a$ connected to the lines $L^1$ and $L^2$ and a secondary winding $18^b$, the connections of which will be explained later. A time switch 19 has normally closed contacts $19^a$, normally open contacts $19^b$ and an electric heater $19^c$, the latter being adapted to be connected across lines $L^1$ and $L^2$ in series with a resistor 20. A normally open push button switch 21 is connected in circuit with the winding $13^a$ of relay 13. An adjustable resistor 22 is connected to shunt the coil $12^a$ under certain conditions as will be explained later, while a second resistor 23 which is connected in series with the coil 12ᵃ reduces the current drawn from the line under such short-circuiting conditions. Associated with the electronic tube 16 is a resistor 24 one end of which is connected to the cathode of said tube while the other end is connected in series with a condenser 25 to the control electrode. An adjustable resistor 26 is also connected to the control electrode, and may be connected in shunt with the condenser 25 by means of the normally closed contact 15ᶜ. A further resistor 27 is adapted to be connected in series with secondary winding 18ᵇ of transformer 18 and the resistance 24.

The connections of the various parts are clearly illustrated in the drawings and need no further description here. The apparatus functions as follows: If the lines L¹ and L² are energized, the thermostat heater winding 19ᶜ is connected across the lines L¹—L² in series with resistor 20 through the normally closed contacts 17ᵈ. The heater therefore raises the temperature of the thermostatic time switch 19 and the latter opens the contacts 19ᵃ and closes the contacts 19ᵇ thereby closing the circuit for the coil 17ᵃ and causing the relay 17 to be energized. Energization of this relay closes the contacts 17ᵇ and 17ᶜ and opens the contact 17ᵈ. Closure of contacts 17ᶜ maintains the relay in the closed position independent of the thermostatic switch, while opening of contacts 17ᵈ disconnects the heater winding 19ᶜ from the line. The relay therefore cools down again and opens contacts 19ᵇ and closes contact 19ᵃ. The purpose of the thermostatic switch and relay 19 just described is to prevent the energization of relay 13 before the cathode of tube 16 has had time to heat up sufficiently to permit its functioning as required, the thermostatic relay 19 being for this purpose so proportioned as to permit the tube 16 sufficient time to attain normal temperature.

If it is now decided to start the welder, the operator pushes the start button 21 thereby closing a circuit from line L¹ over contacts 19ᵃ, 17ᵇ, 11ᵇ, 21 through the coil 13ᵃ to line L². The energization of relay 13 establishes a maintaining circuit for the coil 13ᵃ from line L¹ over contacts 13ᵇ and 14ᶜ, so that the relay 13 will remain closed after the starting button 21 is released. Closure of contact 13ᶜ completes a circuit from line L¹ through coil 12ᵃ of relay 12, resistor 23 to line L². This closes contacts 12ᶜ and completes a circuit from line L¹ through electromagnet 9 to line L². When the magnet 9 is energized, pressure fluid is admitted to the cylinder 7 and the piston 6 moves forward, thereby exerting pressure on the material to be welded which has been inserted between the jaws 1 and 2. When the welding jaws meet the material, the pressure in the cylinder 7 gradually increases until it reaches a value at which the pressure switch 10 responds and closes the contact 10ᵇ and opens contact 10ᵃ.

The operation of tube 16 is fully explained in the patent by Stansbury et al. No. 1,892,017 and will be described here only insofar as is necessary for an understanding of the present system.

When the lines L¹ and L² are initially energized the grid 16ᶜ is slightly positive with respect to the cathode 16ᵃ so that the tube will conduct current during the positive half cycle of the alternating current. This energizes relay 15 and the relay opens contacts 15ᵇ and 15ᶜ and closes contacts 15ᵈ. The closure of contacts 15ᵈ completes a circuit from the transformer winding 18ᵇ through contacts 10ᵃ and 15ᵈ to one plate of the condenser 25 which is thereby made highly positive with respect to the cathode, during the positive half cycle of the alternating current and a charge accumulated on the condenser. If now the contact 10ᵃ is opened, the highly positive plate of the condenser 25 through its connection with the cathode 16ᵃ by the resistance 24 will assume a lower potential and the opposite plate connected to the grid 16ᶜ will simultaneously have its potential changed to a high enough negative value to prevent further discharge of the tube during the positive half cycle and thereby cause deenergization of the relay coil 15ᵃ. The relay therefore closes contact 15ᵇ which, in turn, energizes relay 11 and this causes closure of contact 11ᵈ. As contacts 10ᵇ and 13ᵈ are also closed, the switch 14 is energized and contacts 14ᵇ are closed, thereby connecting the primary 5 of the transformer across the lines L¹ and L² and causing the current to flow in the secondary winding 3 of said transformer.

The deenergization of relay 15 also closes contacts 15ᶜ, thereby establishing a discharge circuit for the condenser 25 through the adjustable resistor 26, contacts 15ᶜ, back to the other side of the condenser. The condenser therefore discharges until the negative potential of the grid 16ᶜ has been reduced to a value which will again permit the starting of current flow through the tube 16 during the positive half cycle. The time during which the condenser discharges and maintains the grid 16ᶜ sufficiently negative to prevent conduction thereof may be adjusted by adjusting resistor 20 or by adjusting the capacitor 25.

When the tube 16 finally again becomes conducting, the relay 15 is energized thereby opening contact 15ᵇ which deenergizes the relay 11 and this, in turn opening the circuit to the switch coil 14ᵃ which becomes deenergized and opens the primary winding 5 of the transformer 4, thus discontinuing current flow to the welder jaws.

Deenergization of relay 11 also opens contacts 11ᶜ and thus the circuit of relay coil 13ᵃ. The relay 13 when deenergized opens the contacts 13ᶜ thus breaking the direct connection of the relay coil 12ᵃ with line L². The circuit however is still maintained from line L¹ through contacts 12ᵇ and resistor 22. When relay 13 is completely deenergized contacts 13ᵉ are closed and when the switch 14 has completely opened, contacts 14ᵈ are also closed so that now the relay coil 12ᵃ is short-circuited through the variable resistor 22 and becomes deenergized to open contacts 12ᵇ and 12ᶜ after the lapse of a suitable time interval determined by the constants of the short circuited loop described and the adjustment of resistor 22. The opening of contacts 12ᶜ opens the current supply to electromagnet 9 deenergizing the latter and opening the valve 8 of the hydraulic cylinder 7 and permitting the return of the piston 6 through any one of a number of well known mechanisms (not shown here) and the separation of the welding jaws 1 and 2. This last described arrangement assures that full pressure is maintained between the welding jaws for an adjustable time after the welding current has been interrupted to assure proper solidification of the material in the weld and proper cooling before the pressure is removed.

Fig. 2 is a modification of the system illustrated in Fig. 1, whereby it is possible for the operator to select the time during which current flows to the weld by pushing one of a multiplicity of starting buttons. Only so much of the apparatus is own as is necessary for the understanding of
operation. All parts of the system not shown
duplicates of those shown in Fig. 1 and their
eration is as explained in connection with the
scription of Fig. 1.

Instead of providing the single starting button
of Fig. 1 as many of such buttons as desired
1, 221 are provided. The relay 13 is replaced
relays 113, 213, having respectively normally
en contacts 113ᵇ, 113ᶜ, 113ᵈ, 113ᶠ and 213ᵇ, 213ᶜ,
3ᵈ, 213ᶠ and normally closed contacts 113ᵉ and
3ᵉ. Furthermore I provide on relay 11 normally open contacts 111ᶜ and 211ᶜ respectively
d on switch 14 normally closed contacts 114ᶜ
d 214ᶜ. Associated with each push button
itch is a discharge timing resistor 126 and 226
spectively to take the place of resistor 26 in
e system Fig. 1. The contacts 113ᶠ and 213ᶠ
mplete the circuit of the respective resistor
pending upon the push button switch which has
en operated.

The functioning of the modified system is obvious. The operator selects the push button switch
hich corresponds to the welding time desired,
ter which the respective relay 113 or 213 is
energized and the welding cycle completed as
oredescribed in connection with Fig. 1. It is
vious that instead of only two any desired
umber of push button switches and coordinated
ements may be employed.

What I claim as new and desire to secure by
etters Patent is:

1. In an electric welder system, in combination,
elding jaws, means to effect relative movement
hereof and to cause them to exert pressure on
e material to be welded, a power supply and
ycle controlling means for controlling the aforementioned means and the supply of power from
id power supply to said jaws, the second mentioned means comprising a normally open pilot
witch operable to initiate an operating cycle, an
lectron tube timer which controls the duration
f power supplied to said jaws, and additional
iming means associated with the first mentioned
eans and with said tube timer to effect separation of said jaws following termination of supply
f power to the latter but subject to predetermined time delay during which the jaws continue
o exert pressure on the material being welded,
aid additional timing means being adjustable in
espect of the time element thereof independently
f the time element of said tube timer.

2. In an electric welder system, in combination,
welding jaws, means to effect relative movement
hereof and to cause them to exert pressure on the
material to be welded, a power supply and cycle
ontrolling means for controlling the aforementioned means and the supply of power from said
ower supply to said jaws, the second mentioned
means comprising a normally open pilot switch
perable to initiate an operating cycle, an electron
ube timer which controls the duration of power
upplied to said jaws, and electric energy storing timing means associated with the first mentioned means and with said tube timer to effect
eparation of said jaws following termination of
upply of power to the latter, but subject to predetermined time delay during which the jaws continue to exert pressure on the material being
welded, said timing means associated with said
tube timer being adjustable in respect of the time
element thereof independently of the time element of said tube timer.

3. In an electric welding system, in combination, welding jaws, means to effect relative movement thereof and to cause them to exert pressure
on the material to be welded, an electric power
supply and means controlling the aforementioned means and also controlling the supply of
current from said power supply to said jaws, the
second mentioned means comprising an electron
tube timer which times the duration of current
supply to said jaws and further comprising a second timing means of an electric energy storing
type associated with the first mentioned means
and with said tube timer to maintain the material being welded under pressure of said jaws
for a predetermined period following termination of supply of current to said jaws and then to
effect separation of said jaws for release of the
welded material.

4. In an electric welding system, in combination, welding jaws, means to effect relative movement thereof and to cause them to exert pressure on the material to be welded, an electric
power supply and means controlling the aforementioned means and also controlling the supply of current from said power supply to said
jaws, the second mentioned means comprising
an electron tube timer which times the duration
of current supply to said jaws and further comprising a second timing means of an electric
energy storing type associated with the first mentioned means and with said tube timer to maintain the material being welded under pressure of
said jaws for a predetermined period following
termination of supply of current to said jaws
and then to effect separation of said jaws for
release of the welded material, the second mentioned timing means being adjustable in respect
of the time element thereof independently of the
time element of said tube timing means.

5. In an electric welding system, in combination, welding jaws, means to effect relative movement thereof and to cause them to exert pressure
on the material to be welded, an electric power
supply and means controlling the aforementioned means and also controlling the supply of
current from said power supply to said jaws,
the second mentioned means comprising an electron tube timer and selective control means
therefor by which the duration of current supply
to said jaws is limited and subject to variation,
and further comprising a second timing means
of an electric energy storing type associated with
the first mentioned means and with said tube
timer to maintain the material being welded
under pressure of said jaws for a predetermined
period following termination of supply of current to said jaws and then to effect separation of
said jaws for release of the welded material, the
second mentioned timing means being adjustable
in respect of the time element thereof independently of the time element of said tube timer.

6. In an electric welding system, in combination, welding jaws, means to effect relative movement thereof and to cause them to exert pressure on the material to be welded, an electric
power supply and means controlling the aforementioned means and also controlling the supply of current from said power supply to said
jaws, the second mentioned means comprising an
electron tube timer which initiates power supply to said jaws upon attainment of a given value
of said pressure and which times the duration of
current supply to said jaws and further comprising a second timing means of an electric energy
storing type associated with the first mentioned
means and with said tube timer to maintain the
material being welded under pressure of said jaws for a predetermined period following termination of supply of current to said jaws and then to effect separation of said jaws for release of the welded material, said second mentioned timing means being adjustable in respect of the time element thereof independently of the time element of said tube timer.

7. In an electric welding system, in combination, welding jaws, means to effect relative movement thereof and to cause them to exert pressure on the material to be welded, an electric power supply and means controlling the aforementioned means and also controlling the supply of current from said power supply to said jaws, the second mentioned means comprising an electron tube timer which initiates power supply to said jaws upon attainment of a given value of said pressure and which times the duration of current supply to said jaws, selective control means for said timer to vary said duration of current supply and a second timing means of an electric energy storing type associated with the first mentioned means and with said tube timer to maintain the material being welded under pressure of said jaws for a predetermined period following termination of supply of current to said jaws and then to effect separation of said jaws for release of the welded material, said second mentioned timing means being adjustable in respect of the time element thereof independently of the time element of said tube timer.

CARROLL STANSBURY.